April 29, 1958   V. M. KRAMER ET AL   2,832,096
APPARATUS FOR MAKING CORRUGATED RUBBER TUBING AND THE LIKE
Filed Sept. 21, 1953
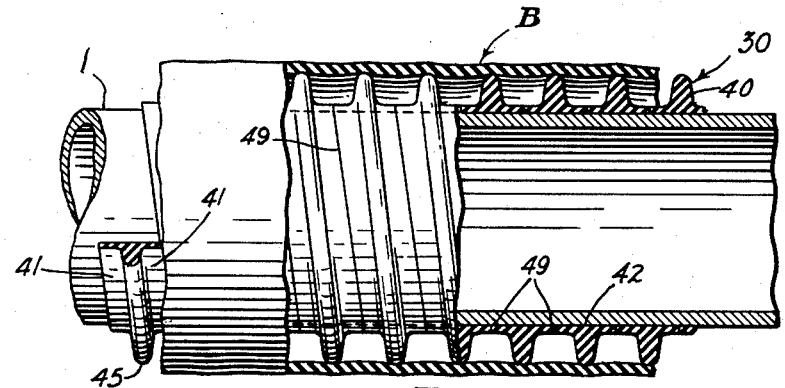
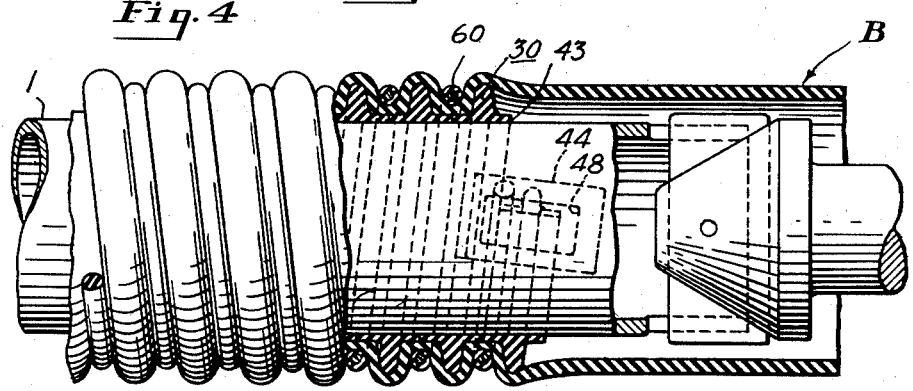
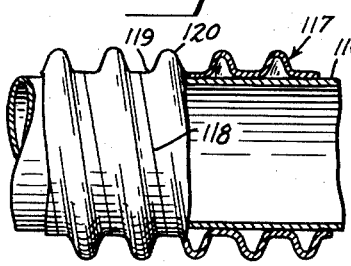
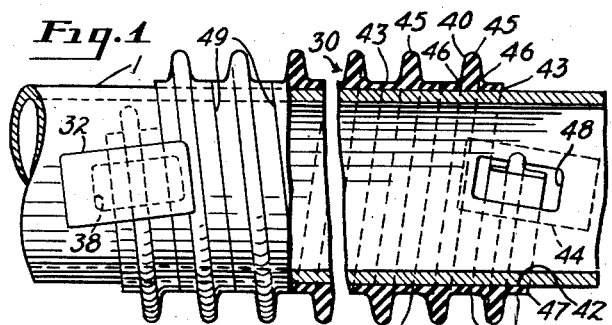
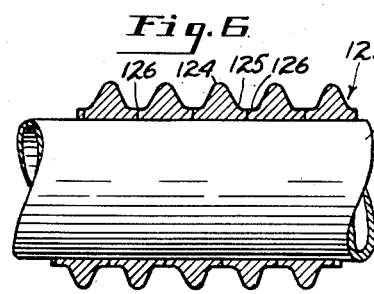
INVENTORS
Vance M. Kramer
Lawrence W. Carlton
BY George Knowles
ATTORNEY United States Patent Office 2,832,096
Patented Apr. 29, 1958

2,832,096

APPARATUS FOR MAKING CORRUGATED RUBBER TUBING AND THE LIKE

Vance M. Kramer, Cleveland, and Lawrence W. Carlton, North Baltimore, Ohio

Application September 21, 1953, Serial No. 381,258

9 Claims. (Cl. 18—45)

This invention relates to the making of ridged or corrugated rubber tubing and the like. More particularly the invention is concerned with the making of rubber tubing having a continuous spiral corrugation by a "cording" process, in which a flexible tensile element or cord is wrapped spirally about rubber or other stock carried by an elongated rotatable mandrel, the pressing or squeezing of the stock against the mandrel by the tension in the cord resulting in the formation of a spiral groove in the stock which is held by the cording element during curing of the tube.

Reference is made to our co-pending applications for patent Serial No. 475,612, filed December 16, 1954, for Process for Making Spiral Corrugated Rubber Tubing and Tubing so Made, and Serial No. 478,439, filed December 16, 1954, for Apparatus for Use in Making Rubber Tubing, describing and claiming related subject matter.

In the making of corrugated tubing by the "cording" process as heretofore practiced considerable difficulty has been experienced in obtaining a tube of uniform section, strength and physical characteristics. Previously the positioning and spacing of an internal core piece for shaping or defining the internal corrugations of the tubing have not been entirely satisfactory.

It is, therefore, the primary objective of the present invention to provide a generally improved and economical apparatus for making corrugated tubing of rubber and the like by a "cording" method to the end that the resulting product will be of uniform section, strength, quality and appearance and will be substantially free of objectionable departures from designed wall thickness, corrugation spacings and other dimensional characteristics.

In accordance with the preferred version of this invention the interior of the corrugated tube is shaped by a contoured internal core piece laid up along the length of and supported by a suitable rigid mandrel, the core piece being wrapped about the mandrel in spiral fashion. The core piece is characterized by a cross sectional shape suitably contoured to mold the internal surface of the tube to a predetermined wave form, this being an objective of the invention.

As a refinement of the invention the contoured core piece is preferably T-shape in cross section so that in laying it up along the cylindrical mandrel adjacent turns or convolutions of the core piece are in locating contact with one another. By this arrangement the core piece serves as a gauge and spaces itself along the mandrel. One convolution is laterally confined and supported by adjacent convolutions to resist shifting of the core piece in the obtaining of uniformity of spacing between the convolutions of the tube being formed and, by completely covering the surface of the mandrel, the core piece prevents contact between the mandrel and the rubber tube during curing so that the entire internal surface of the tube is in contact with the material of the core piece to obtain uniform heating and curing, these features all being objectives of the invention.

A further and specialized objective of the invention particularly useful in the making of thick walled tubing is concerned with the removal of the corrugated tubing from the mandrel after curing. The core piece of the present invention, completely covering the mandrel, serves as a spacer between the mandrel and the tubing and can be removed or withdrawn separately in a preliminary step or together with the cured tube. Axial withdrawal of the tubing from the mandrel is thus facilitated, the core piece being used, if desired, as a carrier that slides along the mandrel, or, as an alternative procedure, the core piece being withdrawn axially through one end of the tube while the latter is still on the mandrel to permit subsequent axial withdrawal of the cured tubing from the mandrel without binding.

Other objects and advantages pertain to certain novel combinations and arrangements of apparatus parts and features of construction as set forth in the following detailed description of the invention made in connection with the accompanying drawings forming a part of the specification.

In the drawings:

Fig. 1 is a fragmentary elevational view, partly in section, showing a portion of the cylindrical mandrel and the core strip comprising the internal support or tube shaping form of the present invention;

Fig. 2 is a perspective view of an end portion of the flexible core strip;

Fig. 3 is a fragmentary elevational view, partly in section and with parts broken away and removed, showing the raw or partly cured cylindrical tube stock blank embracing the mandrel and the flexible core strip after the tube blank has been drawn over the mandrel and core strip preparatory to the "cording" operation;

Fig. 4 is an elevational detail, partly in section and with parts broken away and removed, of one end of the mandrel and associated components after the completion of the cording step, this view showing the raw or partly cured rubber tube blank deformed to spiral corrugated shape by and between the core and the cord;

Fig. 5 is a fragmentary elevational view, partly in section and with parts broken away and removed, showing a modification of the invention in which the internal form comprises a core strip of thin sheet metal wrapped spirally about a cylindrical mandrel; and Fig. 6 is a fragmentary elevational view, partly in section and with parts broken away and removed, showing another modified construction of the internal form which comprises a core strip of solid metal wrapped spirally about a cylindrical form or mandrel.

The mandrel or support member employed in the construction of the tube shaping internal form of the present invention and indicated generally at 1, may take the form of a steel tube of uniform section the length of which is determined by practical considerations governing the handling of the mandrel in the plant, accommodating it in an autoclave, open steam or other heater during the curing process, and the matter of supporting the mandrel at its ends without objectionable center deflection under the loads applied as during the "cording" operation. For making synthetic rubber tubing such as used as temporary exhaust tubing for automobiles it has been found satisfactory to use conventional 1½" or 2" diameter seamless steel tubing, the diameter governing the size of the corrugated tubing ultimately produced. The surface of the mandrel is smoothed and polished.

In the spiral winding or laying up of the core strip means on the cylindrical surface of the mandrel the core strip is supplied as from a reel or coil.

During the laying up of the core strip about the mandrel the leading end of such strip is fixed or held in place on the mandrel in a suitable manner as by tying, clamping, or taping, or, as shown, the mandrel may be formed with an opening or aperture 38 into which the leading end of the core strip is inserted and frictionally held. It is contemplated, of course, that, when desirable the frictional interlock illustrated may be used in conjunction with one or more of the other fastening devices such as a strip of pressure sensitive adhesive tape indicated at 32 and which seals the opening 38.

The shape of the core strip 30 and the manner in which it is laid up or assembled on the mandrel 1 are distinguishing characteristics of the present process and apparatus. The core strip is formed of any suitable material such as rolled or extruded metal or plastic or, as in the case of the core strip illustrated as a preferred embodiment of the invention, by extrusion through a suitably shaped die head of an auger machine or extrusion press of a composition of rubber such that the core strip when cured as in open steam has a shape retaining hardness at least equal to or slightly greater than that of the rubber used in making, say, rubber heels for shoes and other footwear. A rubber compound satisfactory for use as core material is a composition having, when cured, a durometer hardness of about 75, tensile strength of about 900 pounds per square inch, and elongation of about 350 percent.

In its characteristic form the core strip 30 is of uniform substantially T shape in cross section, having a central upstanding or body portion 40 of narrow width relative to its height which provides a continuous spiral rib or ridge about the support member and having a base portion comprising oppositely directed base flanges 41 angularly disposed relative to the body and together providing a substantially flat base surface 42 which is received conformatively against the cylindrical surface of the mandrel 1 as the core strip is wrapped spirally about the latter in the laying up operation. Each of the core strip flanges 41, while being thinner than the central upstanding body portion 40, is of sufficient thickness to provide along its outer edge an outwardly directed edge surface 43, the edge surfaces of the two flange portions paralleling one another throughout the length of the core strip. For mandrels of, say, from about 1.5 inch diameter to about 2.5 inch diameter the overall height or radial thickness of the core strip may be about .5 inch with a base flange thickness of about 3/16 inch.

During the placing of the core strip about the mandrel, the strip preferably being tensioned during such process to cause it to grip the mandrel tightly, the operator positions the successive convolutions in side by side relation so that the flanges of adjacent convolutions are engaged edgewise and the spaced parallel axially facing oppositely directed side edge surfaces 43 of adjacent convolutions are in abutting contact with and laterally confine one another. Thus the width of the core strip constituted by the width of the base surface 42, determines the spacing of or locates the core strip convolutions and the core strip constitutes a complete covering for the cylindrical surface of the mandrel 1.

It is apparent that the core strip itself constitutes the measuring gauge by means of which the core strip convolutions are uniformly spaced equal distances axially along the length of the mandrel. The bottom surface of the base portion of the core strip means generates a cylindrically curved surface and also makes contact with the support member across substantially the entire width of the core strip means, the greatest width or transverse dimension of the core strip being across the bottom surface of the base which lies against the support member. As a further refinement of the invention, to obtain a smooth rounded or other internal contour in the corrugated tubing being formed and to obtain the desired cross sectional shape in such tubing the core strip body 40 is formed with a suitably shaped or rounded crest 45. Fillets 46 are formed in the angles between the body portion 40 and each of the flange portions 41, it being understood that the crest edge 45 and the fillets 46 are continuous throughout the length of the core strip. Thus the core strip means has the radially inwardly directed surface 42 in engagement with the support member 1 and a radially outwardly directed surface which is contoured to define the continuuos spiral rib body 40 and a continuous spiral groove alternating along th length of the form. The outwardly directed surface of each convolution of the core strip means has side marginal edges 47 at the extremities of the flange portions 41 which edges register with complemental side marginal edges of adjacent convolutions of the core strip 30 along continuous spiral lines of contact 49.

Upon completion of the wrapping of the core strip about the mandrel the trailing or concluding end of the core strip is suitably secured to prevent its unwrapping or becoming loose on the mandrel. The core strip is thus held firmly in place on the mandrel with the adjacent convolutions contacting or substantially so. As shown, the core strip means is contoured in cross section so that, assembled on the cylindrical support member or mandrel, such core strip means defines a continuous spiral ridge and a continuous spiral groove separating the convolutions of the ridge. A continuous frictional grip is maintained between the base surface 42 of the core strip and the cylindrical surface of the mandrel, this frictional grip being maintained as by the aforesaid laying up of the core strip under tension so that the inherent resilience of the rubber strip causes it to hug the mandrel. Each core strip convolution is laterally confined by adjacent convolutions of the strip for mutually resisting shifting of the core strip axially along the support member. One or more apertures or slots 48 are formed in the mandrel at the end of the latter on which the core placing or wrapping operation is completed. The trailing end of the core strip is inserted through such aperture and into the interior of the mandrel. The core strip is frictionally gripped by the walls of the aperture and the trailing end of the core strip thus is held in place similarly to the manner in which the leading end of the core strip is held in the slot 38. Other arrangements or devices such as cords, tapes or clamps may be used to tie or bind the trailing end of the core strip in place, in lieu of or supplemental to the frictional interlock supplied by the slot 48. A strip of pressure sensitive adhesive tape 44 is applied across the core strip over the slot 48 to seal the latter and to aid in retention of the core strip.

After wrapping the core strip about the mandrel the extruded tube blank B of raw or partly cured rubber is then drawn axially over the mandrel and core. In this assembling operation in which the tube blank B is telescoped over the mandrel the latter may be held manually by one or more operators. When the mandrel is so supported the tube blank B is readily worked over the outer or free end of the mandrel and drawn thus axially over the mandrel and the core strip 30 carried by the latter. As an aid to the assembly the interior of the tube blank B may be treated with a suitable lubricant such as soapstone or a liquid silicone solution or such a lubricant may be painted or sprayed onto the wrapped core strip 30, or the antiadhesion lubricant may be applied to both the interior of the tube and the exterior of the core strip.

As a further aid to assembly the tube blank B may be partially inflated as by introducing air under pressure into the interior thereof during the working of the tube onto the mandrel.

After telescoping the tube blank onto the internal form comprising the mandrel 1 and the core strip 30 the mandrel is mounted as between cone centers so that the mandrel can be power driven during the "cording" operation. The cord or tensile element used in "cording" is indicated at 60 and comprises a rubber or synthetic rubber coated heavy twine or cord such as binder twine. By the abutment of adjacent convolutions of the core strip means against one another they mutually resist axial shifting relative to the support member under loads developed in the cording operation in forcing the raw rubber of the tubing blank into the spiral groove of the corrugated form and in subsequently stripping the cured corrugated tube axially from such form.

At the completion of the cording operation the terminal end of the cord 60 is suitably secured as by wrapping an additional turn about the mandrel and tying in place.

With the walls of the tube blank B thus deformed and forced into and held in the continuous spirally arranged valley or groove between adjacent convolutions of the core strip 30 by the spirally wound and tensioned cord 60, as shown in Fig. 4, the tube blank is constrained to the shape and surface configuration of the internal form for curing. The corded tube blank is placed in a suitable heater such as an open steam chamber or autoclave, where the curing of the tube blank takes place under heat and pressure in accordance with conventional procedure.

After the heat curing the tube is withdrawn from the heater and cooled by water or air while still corded on the mandrel to preserve the corrugated shape. Removal of the cured and cooled corrugated tube from the mandrel requires, first, the unwrapping of the tensile cord element 60.

In the simplified version of the present process, and that which is preferred, especially for smaller size corrugated tubing, say under about 4 inches in external diameter, or in making tubing having relatively shallow corrugations, the tubing after curing is removed or stripped from the internal form or mandrel by fluid pressure. The internal pressure thus applied to the cured tube at one end of the internal form serves partially to inflate the cured tube and free the tube from the external surface of the form on which the curing of the tube took place. It is apparent that the spirally arranged core strip 30 provides a continuous channel between adjacent turns of the ridge or crest portion 45 of the core strip, this channel extending helically around the internal form or mandrel throughout the entire length of the corrugated portion of the cured tubing.

As the spiral migration of the internal air or fluid pressure effects complete freeing or separating of the molded tube convolutions from the internal mandrel or form, the continued application of the fluid pressure forces the inflated distended tube off the free end of the internal form.

Other types of internal forms or mandrels that may be used with the "blow off" process of the present invention are shown in Figs. 5 and 6. The internal form of Fig. 5 comprises an elongated cylindrical tube 116 about which is wrapped a ridge forming strip or core piece 117 of thin sheet metal such as steel, chromium plated copper or the like. The hat section shape of the core strip 117 is obtained by rolling flat strip stock metal between suitable rollers contoured to deform the flat strip to the desired cross sectional shape illustrated. The rolling of the strip metal and the wrapping of the roller strip in spiral fashion about the cylindrical tube 116 are preferably carried out in a single continuous process so that in the shaping of the flat strip stock to the desired hat shape cross section a helical or spiral form is also imparted to the strip. In this manner the strip 117 conforms naturally to the cylindrical shape of the supporting tube 116, the edges of the axially directed flanges of adjacent convolutions of the strip 117 abutting one another along a continuous spiral line 118 located in the bottom of groove 119 between adjacent convolutions of the crest or ridge 120. As the contoured sheet metal strip 117 is laid up along the length of the tubular support 116 it is desirably pressed into place by a suitably contoured roller or rollers to insure conformance of the strip to the cylindrical contour of the tube and to iron out any irregularities and surface defects that may be present in the strip. Soldering or brazing secures the strip 117 to the tubular support 116, the solder or brazing material preferably extending along the entire length of the meeting line 118 of the core strip flanges to secure adjacent convolutions of the ridge strip together as well as to secure the edge flanges of such strip to the underlying cylindrical support.

The internal form of Fig. 6 comprises a cylindrical tube, rod or bar 122 about which is wrapped and forced into place as by rolling between suitably contoured rollers a continuous helical core strip 123. This strip is formed of aluminum, brass, copper or the like suitably plated as with chromium or nickel to eliminate adhesion by the rubber of the tube blank during the curing process. The strip includes central ridge or crest portion 124 and flange portions 125 which abut one another along a continuous spiral meeting line 126. Brazing, soldering or riveting secures the core strip 123 to the support bar 122, as described in connection with the preceding figure.

In the removing or stripping of cured tubes from the internal forms or mandrels by the "blow off" procedure described, some distortion or stretching of the walls of the cured tube is necessary. In certain situations, however, as in the case of tubing having relatively deep corrugations or in the case of tubing compounded of stiff stock which does not readily stretch sufficiently to become free of the internal form in the expressing operation it is desirable to separate the cured or molded corrugated tube from the internal form by somewhat different procedure, which is one of the features of the present invention. This further refinement of the present process involves the use of the composite type of internal form described in connection with Figs. 1 through 4, wherein a flexible spiral core strip is wrapped about the internal form and may be readily separated therefrom after each curing operation so that the separation of the core strip from the cylindrical mandrel or support is a procedural step in each cycle of operation.

The release the grip of the core strip 30 on the cylindrical surface of the mandrel while the core strip and the molded corrugated tube are still in place, as when it is desired to remove simultaneously from the mandrel both the core strip 30 and the molded tube T, the ends of the core strip are first released from the mandrel as by untying or withdrawal from the slots 38 and 48 and the molded tube is then twisted in place so as to slacken the underlying core strip. The molded tube and the core strip 30 are then readily withdrawn axially from the mandrel 1 after slackening the core strip, the core strip being subsequently withdrawn from the interior of the molded tube through one end of the latter.

As an alternative procedure for separating the molded tube from the mandrel and core strip the core strip may be withdrawn axially from between the mandrel and the molded tube, out one end of the latter between the surface of the mandrel and tube. This withdrawal of the core strip requires only slight local distortion of the tube B. After such preliminary withdrawal of the core strip the molded tube is then slid axially off the mandrel.

Another procedure is to introduce air under pressure between the mandrel and the molded tube as by inserting a suitable nozzle on a high pressure supply line between one end of the tube and the surface of the mandrel. The slight distention of the tube thus obtained by the internal air pressure enables the operator to slide the tube and core strip together axially off the mandrel, the core strip being withdrawn from the interior of the molded tube in a subsequent operation for reuse in the process.

Either the diameter or length of the mandrel 1 or both its diameter and length can be varied without changing the core strip 30 or the cording element 60. Furthermore the core strip and the cording element can be modified without reference to one another and without reference to the mandrel. At small expense, therefore, a plant employing the present apparatus can adapt its equipment to suit the varying requirements of the trade and produce a wide variety of corrugated tubes of different characteristics, shapes and sizes such as automotive radiator connecting hose, marine engine cooling system hose, engine exhaust tubes or conduits, respirator and gas mask tubes and the like.

In accordance with the patent statutes the principles of the present invention may be utilized in various ways, numerous modifications and alterations being contemplated, substitution of parts and changes in construction being resorted to as desired, it being understood that the apparatuses shown in the drawings and described above are given merely for purposes of explanation and illustration without intending to limit the scope of the claims to the specific details disclosed.

What we claim and desire to secure by Letters Patent of the United States is:

1. An internal form for shaping a rubber tube or the like during curing, said form comprising an elongated support and a resilient deformable core strip wound about the support in the form of a continuous helix, the core strip having spaced parallel side edges, such side edges of adjacent convolutions of the core strip abutting one another, the core strip having an upstanding portion of uniform height and substantially completely enclosing and covering the support, and the form having an outwardly directed corrugated surface comprising a continuous spirally arranged ridge and a continuous spirally arranged groove.

2. An elongated spirally corrugated form for receiving a raw rubber tube or the like and supporting the received tube during curing to impart a spirally corrugated shape to the tube, said form comprising an elongted support member and core strip means wrapped spirally about the support member, the core strip means comprising a central upstanding portion and abutting flange portions and being contoured in section to define a continuous spiral ridge and a continuous spiral groove separating the convolutions of the ridge, adjacent convolutions of the wrapped core strip means being disposed in side by side contacting relation to one another to locate the convolutions uniformly along the support member and mutually to resist relative shifting of the convolutions of the core strip means axially of the support member under loads developed in forcing a received raw rubber tube into the spiral groove of the corrugated form and in stripping the cured corrugated tube axially from such form.

3. An elongated spirally corrugated form for receiving a raw rubber tube or the like and supporting the received tube during curing to impart a spirally corrugated shape to the tube, said form comprising an elongated support member of circular section and rubber core strip means wrapped spirally about the support member, the rubber core strip means having a substantially uniform cross section comprising a base portion disposed against the support member and a relatively narrow upstanding portion providing a continuous spiral rib about the support member, the base portion of the core strip section generating a curved surface making contact with the support member across substantially the entire width of such core strip means, the core strip means having axially facing oppositely directed side surfaces extending radially from the support member, and said radial side surfaces on adjacent convolutions of the rubber core strip means being disposed against one another in mutually supporting relation along a line of abutment extending spirally about the form.

4. A spirally ribbed and grooved form for receiving a raw rubber tube or the like and supporting the received tube while it is forced into the spiral groove of the form to impart a spirally corrugated shape to the tube and while the shaped tube is cured, said form comprising an internal support member and a core strip mutually of uniform transverse section wrapped spirally about the support member, the core strip having a relatively wide base received conformatively against the support member, the greatest transverse dimension of the core strip section being across the base, the spiral convolutions of the core strip defining a continuous spiral rib and a continuous spiral groove about the form, and each core strip convolution being laterally confined by adjacent convolutions of the strip mutually to resist shifting of the core strip axially along the support member.

5. A spirally ribbed and grooved form for receiving a raw rubber tube or the like and supporting the received tube while it is forced into the spiral groove of the form to impart a spirally corrugated shape to the tube and while the shaped tube is cured, said form comprising an internal support member and a core strip wrapped spirally about the support member with adjacent convolutions of the strip abutting one another to locate the convolutions uniformly along the support member and providing mutual support against relative shifting axially along the support member, the core strip convolutions defining a continuous spiral rib and a continuous spiral groove, and the core strip having a hat shaped transverse section the greatest transverse dimension of which is at the cylindrical surface of the support.

6. A spirally ribbed and grooved form for receiving a raw rubber tube or the like and supporting the received tube while it is forced into the spiral groove of the form to impart a spirally corrugated shape to the tube and while the shaped tube is cured, said form comprising an internal support member and a core strip generally T shaped in transverse section wrapped about the support member in spiral convolutions, the core strip having a base portion disposed conformatively against the support member, and including oppositely directed continuous flanges which in each convolution are engaged edgewise against corresponding flanges of adjacent convolutions.

7. An elongated spirally corrugated form for receiving a raw rubber tube or the like and supporting the received tube during curing to impart a spirally corrugated shape to the tube, said form comprising an elongated support member and core strip means wrapped spirally about the supoprt member, the core strip means having a substantially uniform cross section and comprising a base portion disposed against the support member and an upstanding rib portion, the core strip means having a radially inwardly directed surface in engagement with the support member and a radially outwardly directed surface contoured to define a continuous spiral rib and a continuous spiral groove alternating along the length of the form, the outwardly directed surface of each convolution of the core strip means having side marginal edges which register with complemental side marginal edges of adjacent convolutions of the core strip means along continuous spiral lines of contact, and each convolution of the core strip means being laterally confined by adjacent convolutions for mutually resisting axial shifting of such core strip means along the support member.

8. A spirally ribbed and grooved form for receiving theerover a raw rubber tube or the like and corrugating the received tube by having the tube forced into the spiral groove, said form comprising a support member and a core strip wrapped spirally about the support member, the core strip having a substantially uniform cross section and comprising a relatively wide base portion disposed conformatively against the support member and a relatively narrow upstanding portion providing a spiral rib continuous about the support member, the base portion of the core strip having spaced oppositely directed sides extending radially from the support member, and the radial sides on the base portion of each convolution of the core strip being of substantially the same radial dimension and disposed in mutually abutting relation against the radial sides on the base portions of adjacent convolutions of the core strip to locate the convolutions uniformly along the support member and to resist relative axial shifting of the individual convolutions under axial forces imposed on the core strip convolutions in corrugating the tube and in stripping the corrugated tube from the form.

9. An elongated internal form for use in the making of a spirally corrugated flexible tube of rubber or the like by a cording process wherein a partially cured tube blank is drawn over and supported on the form, the supported blank is wrapped with a flexible cord to conform the tube blank to the shape of the form, and the wrapped blank is cured while so wrapped and is subsequently unwrapped and separated from the form; which form comprises an elongated support and a shaping strip wrapped spirally about the support and substantially completely covering the external surface of the support, said shaping strip being of uniform section and having generally parallel side faces, the side faces of adjacent convolutions of the strip being disposed against one another to locate the convolutions at uniform pitch along the support, the strip having an inner face substantially co-extensive with and laid against and in contact with substantially the entire surface of the support to support the strip under radial loads imparted by the cording of the tube blank, and the strip having an outer face contoured across its width to define the inside surface of a convolution of the corrugated tube being shaped.

References Cited in the file of this patent

UNITED STATES PATENTS

| | | |
|---|---|---|
| 1,280,170 | Crawford | Oct. 1, 1918 |
| 1,361,001 | Blaisdell | Dec. 7, 1920 |
| 1,797,193 | Kimmich | Mar. 17, 1931 |
| 2,250,967 | Riddle | July 29, 1941 |
| 2,366,087 | Chernack | Dec. 26, 1944 |
| 2,384,056 | Tritt | Sept. 4, 1945 |
| 2,395,144 | Stivason | Feb. 19, 1946 |
| 2,560,369 | Roberts | July 10, 1951 |
| 2,584,501 | Roberts | Feb. 5, 1952 |
| 2,625,979 | Harris et al. | Jan. 20, 1953 |
| 2,707,017 | Beare et al. | Apr. 26, 1955 |

UNITED STATES PATENT OFFICE
CERTIFICATE OF CORRECTION

Patent No. 2,832,096                                                 April 29, 1958

Vance M. Kramer et al.

It is hereby certified that error appears in the printed specification of the above numbered patent requiring correction and that the said Letters Patent should read as corrected below.

Column 4, line 4, for "continuuos" read -- continuous --; column 6, line 35, for "The" read -- To --; column 7, line 70, after "strip" strike out "mutually"; column 8, line 56, for "theerover" read -- thereover --; line 70, after "mutually" insert -- supporting --.

Signed and sealed this 10th day of March 1959.

(SEAL)

Attest:

KARL H. AXLINE                                                ROBERT C. WATSON

Attesting Officer                                          Commissioner of Patents